(12) United States Patent
Hume (10) Patent No.: US 7,942,295 B1
(45) Date of Patent: May 17, 2011

(54) TOOL CHEST/GLASS RACK APPARATUS

(76) Inventor: John Hume, Grand Junction, CO (US)

( * ) Notice: Subject to any disclaimer, the term of this patent is extended or adjusted under 35 U.S.C. 154(b) by 319 days.

(21) Appl. No.: 12/144,984

(22) Filed: Jun. 24, 2008

(51) Int. Cl.
*B60R 7/00* (2006.01)
*B60R 5/00* (2006.01)
*B60P 7/02* (2006.01)
*B65D 85/28* (2006.01)

(52) U.S. Cl. ... 224/405; 224/403; 224/404; 296/100.02; 296/37.6; 296/100.06; 206/372; 206/373

(58) Field of Classification Search .......... 224/405, 224/403, 404; 296/37.6, 37.7, 180.1, 100.02, 296/100.01; 206/372
See application file for complete search history.

(56) References Cited

U.S. PATENT DOCUMENTS

| | | | |
|---|---|---|---|
| 3,514,023 A * | 5/1970 | George et al. .......... 224/316 |
| 4,303,158 A * | 12/1981 | Perkins ................ 206/373 |
| 4,832,193 A * | 5/1989 | Kime ................... 206/372 |
| 4,846,346 A * | 7/1989 | Kime ................... 206/372 |
| 4,938,398 A * | 7/1990 | Hallsen ................ 224/404 |
| 5,232,259 A | 8/1993 | Booker |
| 5,398,987 A | 3/1995 | Sturgis |
| 5,456,358 A * | 10/1995 | Schmidt ............... 206/373 |
| 6,176,540 B1 | 1/2001 | Whittaker |
| 6,460,744 B2 * | 10/2002 | Lance et al. ........... 224/404 |
| 6,641,013 B2 | 11/2003 | Dise |
| 7,510,078 B2 * | 3/2009 | Schmidt et al. ........ 206/372 |
| 2005/0146151 A1 * | 7/2005 | Walker ................. 296/37.6 |

* cited by examiner

*Primary Examiner* — Nathan J Newhouse
*Assistant Examiner* — Lester L Vanterpool
(74) *Attorney, Agent, or Firm* — Crossley Patent Law; Mark A. Crossley (57) ABSTRACT

A glazier rack and tool chest apparatus for supporting and transporting large glass pieces, including window glass and providing a tool chest in a truck bed, the apparatus providing a hollow base and a top section. In one embodiment, the base provides two top accesses, a pair of side doors, and a front door to access the interior for tool storage and the top section provides a storage tube. The top section hingedly extends to a position atop the base to form, in conjunction with the base, a slanted surface to support large pieces of glass, including window glass, at an angle for stable transport. Tracks affixed to the truck bed and track slides affixed to the base are removably and slidingly engaged for easy removal of the apparatus for multi-use of the truck bed.

5 Claims, 7 Drawing Sheets

TOOL CHEST/GLASS RACK APPARATUS

I claim benefit of U.S. Provisional Application No. 60/939,123 previously filed on May 21, 2007.

FIELD OF THE INVENTION

The present invention relates to glazier racks and, more specifically, to a lightweight glazier rack and tool chest apparatus which supports large glass pieces, including window glass, while also providing a tool chest. In one embodiment, the apparatus from a trapezoidal shape into a lower, more compact hexagonal shape. In another embodiment, legs supporting a top portion of the glazier rack fold to allow the apparatus to collapse. The apparatus is easily installed on and readily removable from a truck bed.

BACKGROUND OF THE INVENTION

Glaziers typically use a truck with a rack for supporting glass, which is transported to a job site for installation. A-frame racks are typically used, but these type racks are relatively tall. Other tall or wide side racks may also be fitted to various trucks for window installation. These various racks and frames prohibit entry of the truck into many areas such as bank drive-thru's and fast food establishments, for example. Additional inconvenience is encountered when rack removal is required, which often is not an easy task. A glazier's truck is, therefore, often relegated solely for use in transporting glass and associated window installation tools only, rather than being used for other transportation needs, which is not cost effective. Along with the glass racks, associated trade tools must be carried. Therefore, tool boxes are specifically fitted to glass-transporting trucks. This practice further negates multi-use of glass-transporting trucks, as well as adding additional bulk and weight to the truck's load. The present apparatus solves these problems by providing a lightweight apparatus for supporting large glass pieces and holding tools, the apparatus being easily installed on and removed from a truck bed. One embodiment folds from an extended trapezoidal shape into a compact hexagonal shape. In another embodiment, legs supporting a top portion of the glazier rack fold to allow the apparatus to collapse.

SUMMARY OF THE INVENTION

The present glazier rack and tool chest apparatus provides a lightweight structure for supporting large glass pieces, such as window pane glass, and for storing tools. The apparatus is extendable and collapsible. One embodiment of the apparatus is trapezoidal shaped while in an extended position and is hexagonal shaped while in collapsed position. The base of the apparatus forms a first trapezoid with a plurality of doors with latches. A plurality of doors provide access to tool storage within the base. An alternative embodiment provides a front door and at least one top access in the base. The top accesses are accessible even when the top section of the apparatus is collapsed to form the apparatus' hexagonal shape or with the top section atop the base. With the top section extended to form the second, larger trapezoidal-shape, the first side and first end of the base and top section, respectively form an elongated slant upon which glass pieces rest. The side of the top section opposite the slanted side is equipped with doors in the preferred embodiment. One embodiment provides two sets of paired, latched doors. The top section also provides a storage tube within and extending continuously along the length of the top section. A tube cover is located at the front end of the top section. The tube cover is retained by a wing nut or other appropriate securement means. The length of the storage tube permits storage of long levels and other lengthy trade tools. Even another embodiment provides a bottom of an alternate top section having reduced dimensions thereby resulting in an eight-sided apparatus, the top side of an alternate base matching those dimensions and having an alternate base angle. This embodiment also provides access to the alternate first base door and alternate second base door, with the alternate top section in the extended position. Still another embodiment has legs supporting a top portion of the glazier rack which fold to allow the apparatus to collapse. The apparatus ideally fits into a truck bed. A track slide on the bottom side of the base and associated track installed in a truck bed enable the apparatus to be slideably, removably secured to a truck bed, thus allowing the truck to be used for multiple purposes without being relegated to limited use for transporting glass and associated tools. Thus, a glazier may convert the truck from use for transporting glass only to use for a plethora of uses, including personal use when not at work or during lunch. Multi-use of the truck thereby provides drastically improved cost effectiveness and convenience.

The present apparatus is constructed from a wide variety of metals, alloys, and synthetics. Lightweight materials are preferably used. For instance, the apparatus may be constructed from aluminum. Lightweight hollow base and top sections are provided for tool storage, eliminating the need for additional tool boxes which are normally carried in or installed in glass-transporting vehicles. The light weight increases the portability of the apparatus for easy removal and installation into a truck bed or other vehicle.

As such, the general purpose of the improved glazier rack and tool chest apparatus which has all of the advantages of the prior art mentioned heretofore and many novel features that result in an improved glazier rack and tool chest apparatus which is not anticipated, rendered obvious, suggested, or even implied by the prior art, either alone or in combination thereof.

An object of the present glazier rack and tool chest apparatus to provide a glazier rack and tool chest apparatus which supports large glass pieces, such as window glass, while also providing for tool storage.

Another object of the present glazier rack and tool chest apparatus is to provide a glazier rack and tool chest apparatus which is lightweight.

Even another object of the present apparatus is to provide a glazier rack and tool chest which extendable and collapsible.

Still another object of the present glazier rack and tool chest apparatus is to provide a glazier rack and tool chest apparatus which is easily installed and removed from a truck bed.

Thus has been broadly outlined the more important features of the improved glazier rack and tool chest apparatus so that the detailed description thereof that follows may be better understood and in order that the present contribution to the art may be better appreciated.

These together with additional objects, features and advantages of the improved glazier rack and tool chest apparatus will be readily apparent to those of ordinary skill in the art upon reading the following detailed description of presently preferred, but nonetheless illustrative, embodiments of the improved glazier rack and tool chest apparatus when taken in conjunction with the accompanying drawings. In this respect, before explaining the current embodiments of the improved glazier rack and tool chest apparatus in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the concept of this disclosure may be readily utilized as a basis for the design of other structures, methods, and kits for carrying out the several purposes of the improved glazier rack and tool chest apparatus. It is therefore important that the claims be regarded as including such equivalent constructions insofar as they do not depart from the spirit and scope of the present invention.

Objects of the improved glazier rack and tool chest apparatus, along with various novel features that characterize the invention are particularly pointed out in the claims forming a part of this disclosure. For better understanding of the improved glazier rack and tool chest apparatus, its operating advantages and specific objects attained by its uses, refer to the accompanying drawings and description.

DETAILED DESCRIPTION OF THE DRAWINGS

With reference now to the drawings, and in particular FIGS. 1 through 8 thereof, examples of the employing the principles and concepts of the present glazier rack and tool chest apparatus, generally designated by the reference number 10A and 10B will be described.

FIGS. 1, 2, 3, 4, and 5 illustrate the preferred embodiment of the glazier rack and tool chest apparatus 10A provided to fit within a truck bed 100 or similar location. The apparatus 10A partially comprises a trapezoidal hollow base 12 and a top section 14. The base 12 has a front side 7a spaced apart from a rear side 7b, a top side 11 and a bottom side 13. The base 12 top side 11 is of a lesser width than the base 12 bottom side 13. The base 12 has a first side 8 spaced apart from the second side 9. The base 12 first side 8 forms the slanted side of the base 12 trapezoidal shape.

Figure 4:
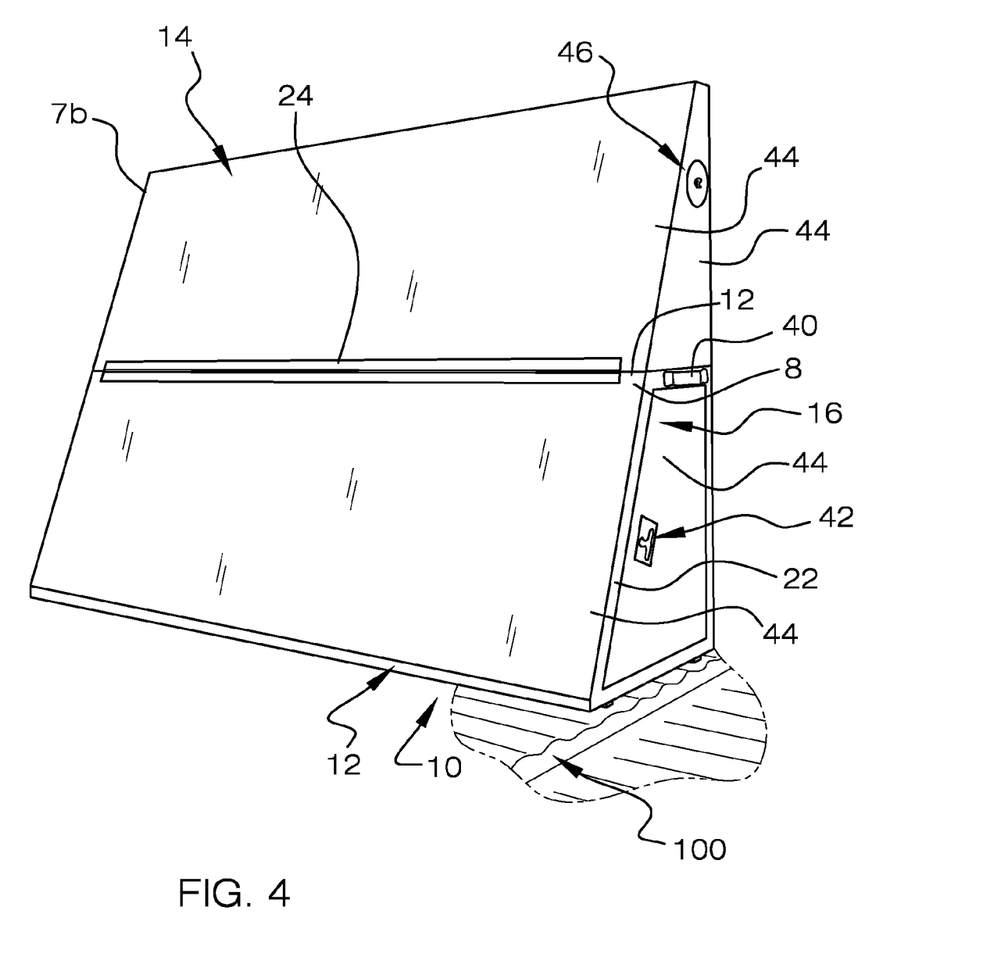
FIG. 4 is a left perspective view with a top section in pivoted position, illustrating the embodiment illustrated in FIG. 1 in extended position.
Figure 5:
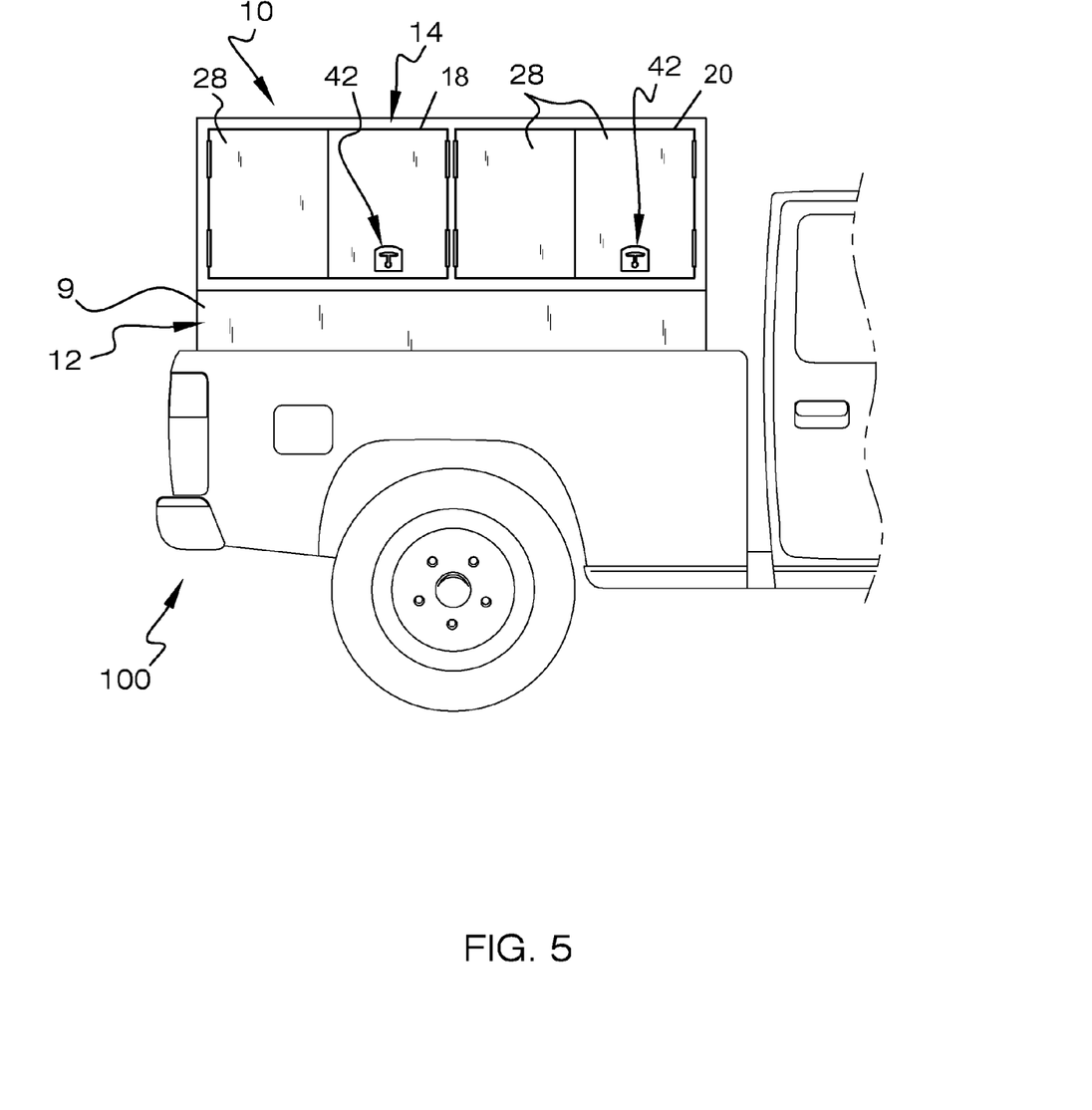
FIG. 5 is a right side elevation of FIG. 4.

A hollow quadrangular top section 14 has a first end 15a spaced apart from a second end 15b, a top edge 17a spaced apart from a bottom edge 17b and a rear end 19a spaced apart from a front end 19b. The first end 15a, second end 15b, top edge 17a, bottom edge 17b, front end 19a and rear end 19b define a hollow interior. The top section 14 top edge 17a is of a lesser width than the top section 14 bottom edge 17b. The top section 14 first end 15a forms the slanted surface of the top section 14. An elongated hinge 24, shown in FIG. 4, is continuously disposed along the junction of the base 12 top side 11 and the base 12 first side 8 as well as along the junction of the top section 14 bottom end 17b and top section 14 first end 15. The top section 14 and the base 12 are thereby hingedly connected and thus form a hexagonal shape when positioned in a collapsed position in which the top section 14 is folded downwardly and is positioned horizontally adjacent to the base 12. The top section 14 and base 12 form a trapezoidal shape when positioned in an extended position in which the top section 14 is positioned atop the base 12. In the extended position of the apparatus 10A, the slanted surface of the top section and the slanted side of the base align to forms a long slanted surface to support large glass pieces, including glass window panes. The glass pieces are supported at an angle for stability during transport. The first side 8 of the base 12 and the first end 15a of the top section 14 may also be fitted with bumpers (not shown) for cushioned support of a glass piece.

The entire apparatus 10A bears a skin 44 constructed from strong, lightweight material, including aluminum. The apparatus 10A provides a base frame 22 and a top section frame 30. The frames 22, 30 provide support for the exterior skin 44 of the apparatus 10A.

Figure 6:
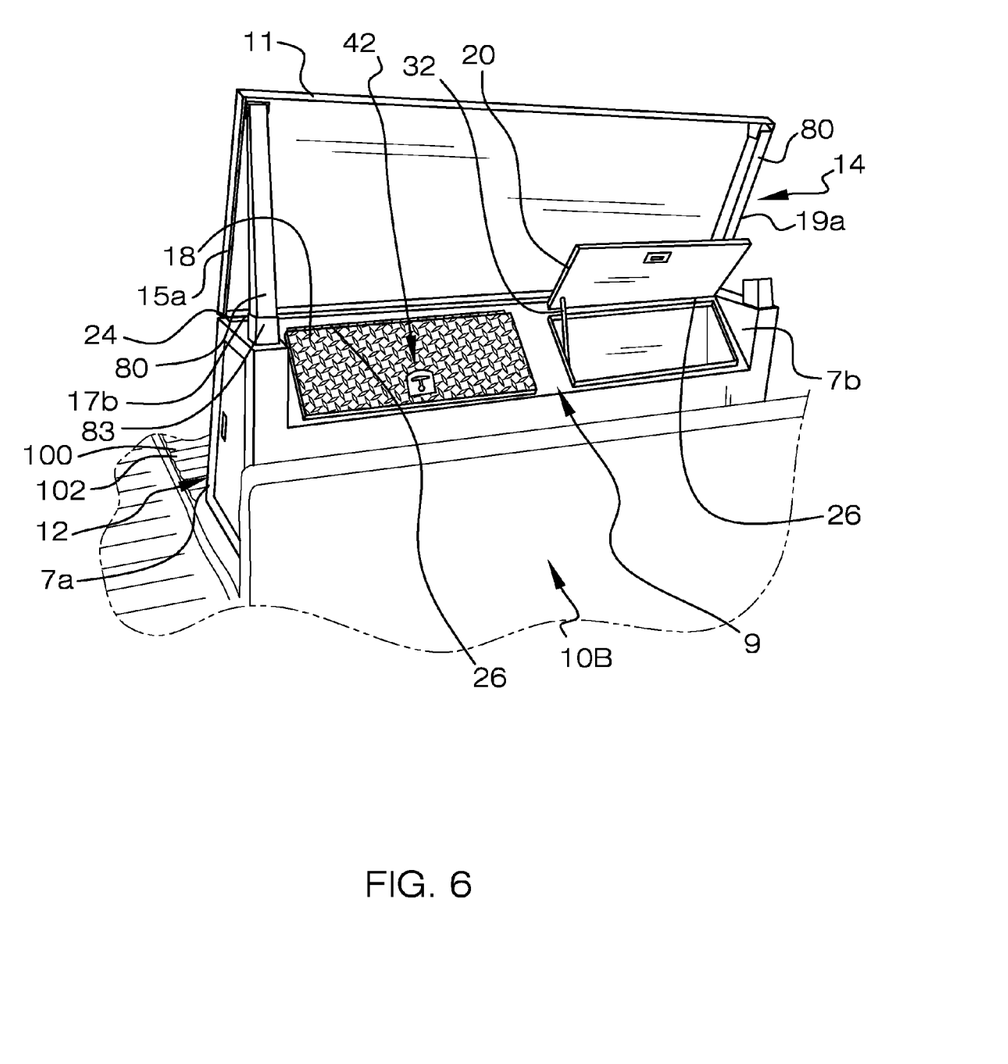
FIG. 6 is an in-use right perspective view of an alternative embodiment illustrating the apparatus in extended position while installed in a truck bed and further illustrating a first top access 0 and second top access in open position.

The base 12 has a front door 16 in the front side 7b, a first top access 18 in the top side 11, and a second top access 20 adjacent to the first top access 18. The hingedly affixed thereto via door hinges 26. The top section 14 has an identical pair of side doors 28 in the second end. The first top access 18 and second top access 20 are shown in FIG. 6 and are the same in the preferred embodiment as in the alternative embodiment. Both the first top access 18 and second top access 20 are assisted in retaining a selectively open position via struts 32 as shown in FIG. 6. The first top access 18 and the second top access 20 form a floor for the top section 14 when the top section 14 is pivoted to be atop the base 12. With the top section 14 pivoted to form the hexagonal shape of the collapsed apparatus 10, the bottom of the top section 14 is open. The top of the top section 14 may also provide drain holes (not shown) to drain any moisture collected in the top section 14 when the apparatus 10A is pivoted into the collapsed hexagonal shape position. Latches 42 are used to selectively secure the front door 16, first top access 18, the second top access 20, and the side doors 28 into closed position. The latches 42 are lockable.

Figure 1:
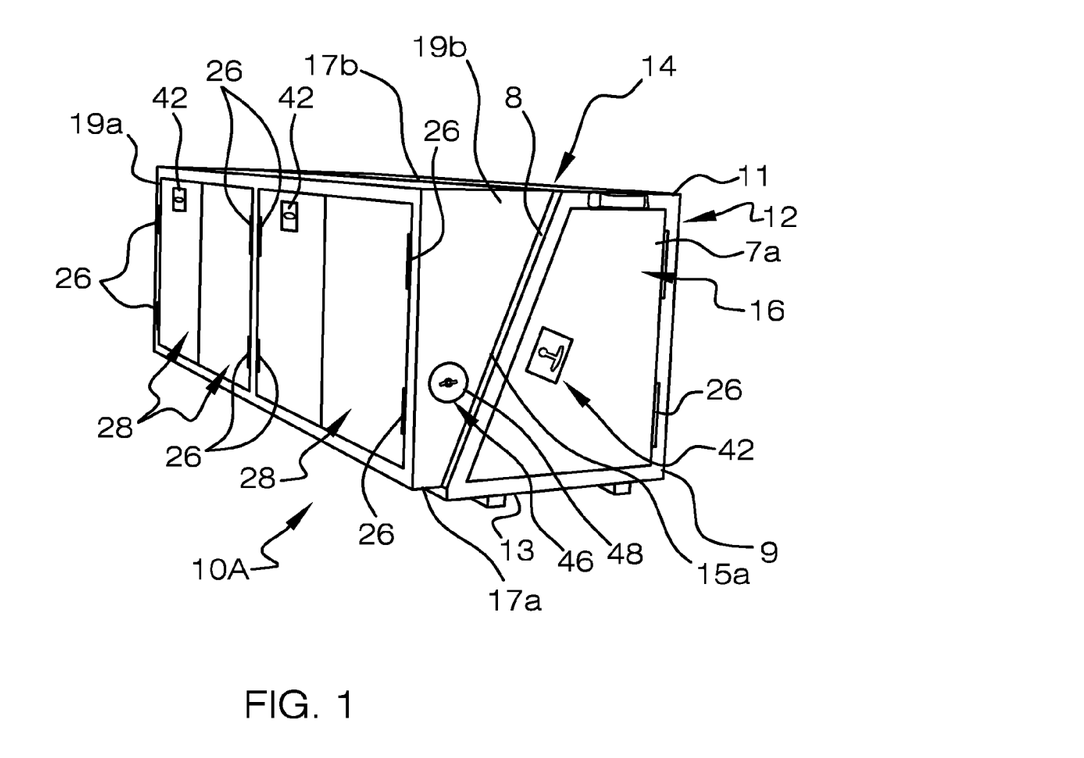
FIG. 1 is a front perspective view of an embodiment in collapsed position.
Figure 2:
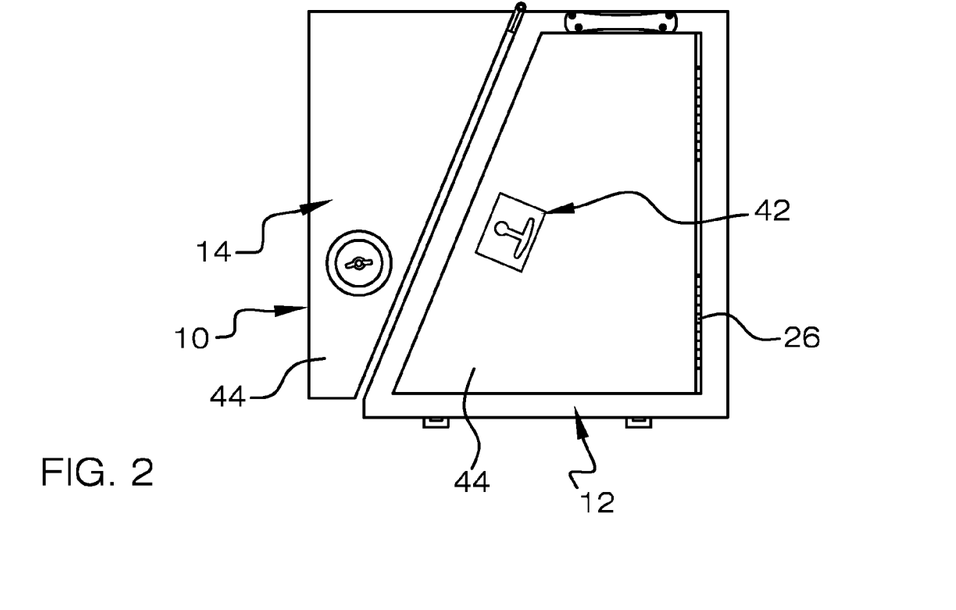
FIG. 2 is a front end elevational view of the embodiment illustrated in FIG. 1
Figure 3:
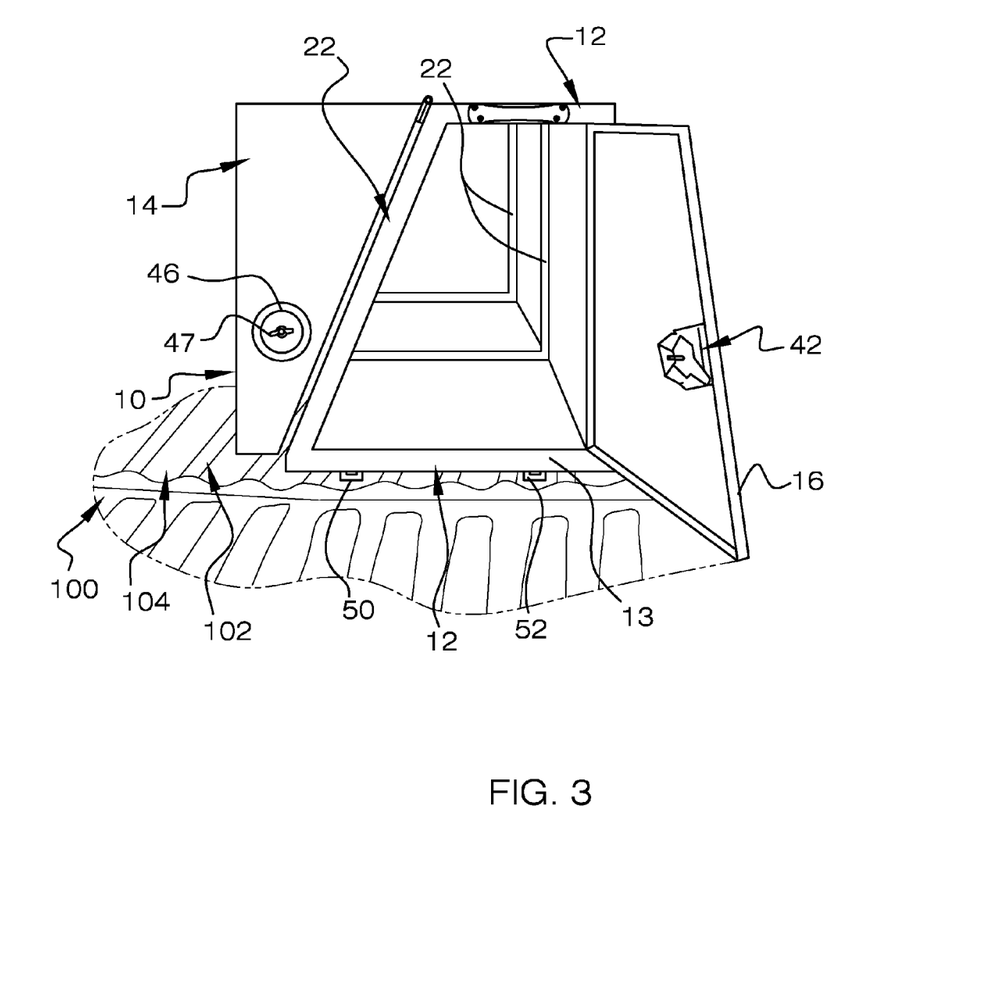
FIG. 3 is a front end elevational view of the embodiment illustrated in FIG. 1, illustrated with a base front door in open position.

A cylindrical hollow storage tube 48 is disposed within the interior of the top section 14. The storage tube 48 has a removable cover 46 and a fastening means 47 to secure the removable cover 46 to the top section 14. FIG. 3 illustrates a wing nut as a type of fastening means 47 which can be used to removably hold the cover 46 in position. Tools such as elongated levels and such can be conveniently protected and stored within tube 48.

Referring again to FIG. 3, the bottom side 13 of the base 12 is fitted with at least two identical spaced apart parallel track slides 52 which extend the length of the bottom side 13. The counterpart tracks 50 are fastened to the truck bed 100 in alignment with the track slides to receive the track slides 52. The entire apparatus 10A, with the exception of the tracks 50, is thereby slideably removable from the truck bed 50. The tracks 50 fit substantially within the hollows 104 between ridges 102 of the truck bed 100. The tracks 50 are secured to the hollows 104 to provide more stability than would occur if the tracks 50 were secured to the ridges 102. When the apparatus 10A is removed from the bed 100, the bed 100 remains virtually unoccupied by the apparatus 10A, except for the tracks 50, thereby leaving the bed 100 unaltered for use for purposes other than transporting large glass pieces and glazier's tools.

Figure 7:
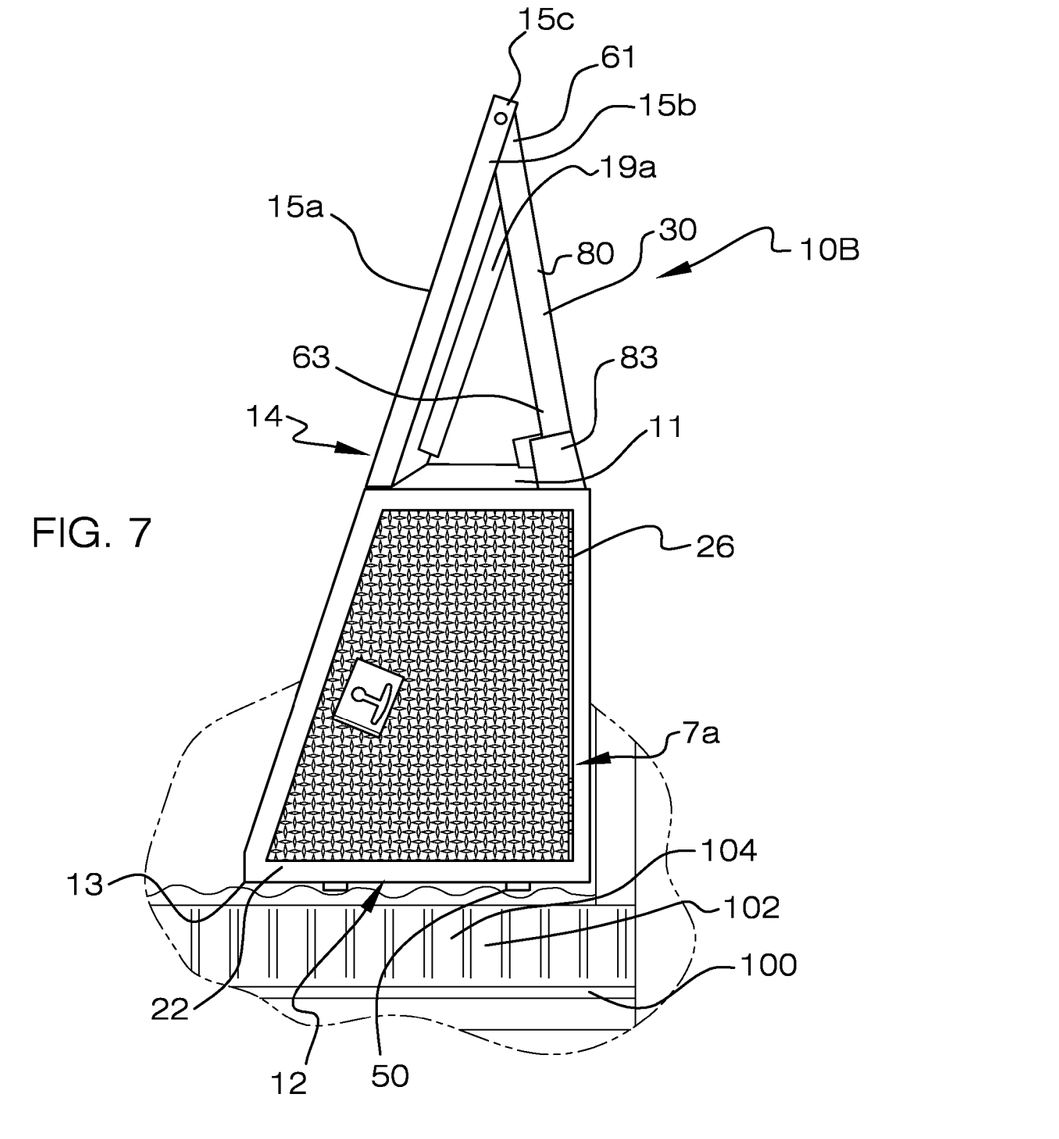
FIG. 7 is a front perspective view of the alternative embodiment of FIG. 6 illustrating the apparatus in extended position and a side door in closed position.
Figure 8:
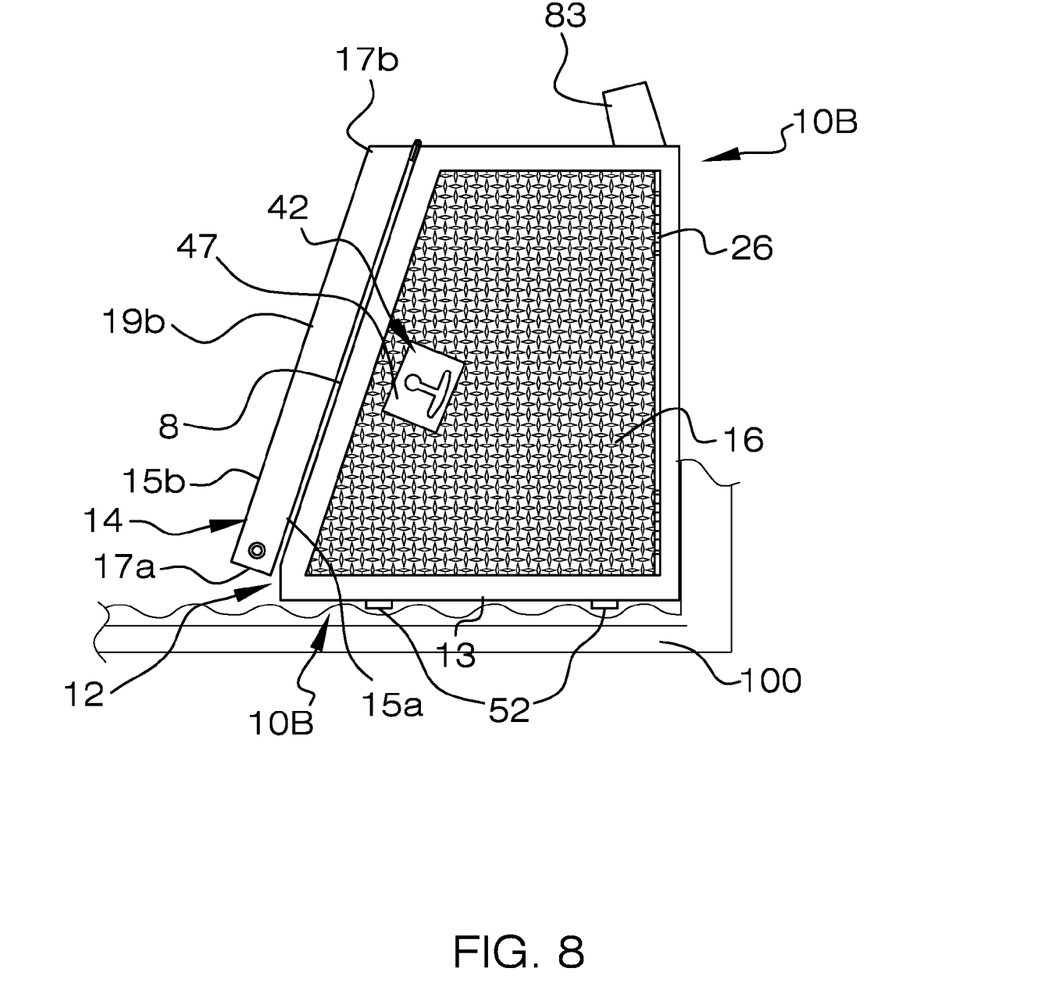
FIG. 8 is a front elevation view of the alternative embodiment of FIG. 6 illustrating the apparatus in collapsed position and a front door in closed position.

FIGS. 6 through 8 illustrate an alternative embodiment 10B. The alternative embodiment 10B is in all respects the same as the preferred embodiment with a few differences, primarily directed to the top section 14. One difference in the top section 14 is that the top section 14 of the alternative embodiment is unenclosed as compared to the top section 14 of the preferred embodiment 10A. In the alternative embodiment, the top section 14 has a thin parallelepiped first end 15a, and a top edge 17a spaced apart from a bottom edge 17b. The alternative embodiment does not have a second end 15b, a rear end 19a, a front end 19b, or a hollow interior as does the preferred embodiment. 10A. As in the preferred embodiment 10A, the alternative embodiment 10B top section 14 top edge 17a is of a lesser width than the top section 14 bottom edge 17b. Further, the first side 8 of the base 12 and the top section 14 first end 15a align to form an elongated slanted surface to support large glass pieces. The bottom edge 17b of the top section 14 is hingedly secured to the base 12 via an elongated hinge 24. When the apparatus is in extended position, the first end 15a of the top section 14 and the first side of the base 12 are selectively hingedly connected to and in longitudinal alignment with each other thereby forming a long slanted surface to support large glass pieces, including glass window panes, at an angle for stability during transport. The alternative embodiment 10B provides a pair of identical elongated parallelepiped support legs 80 having an upper end 61 and a lower end 63. The upper end 61 of each support legs 80 is pivotally attached to the top section 14 top edge 15a outer edge 15c. The lower end 63 of the support legs are removably inserted into a pair of hollow parallelepiped receptacles 83. Each receptacle 83 is affixed to each end of the top side 11 of the base 12. The support legs 80 are selectively collapsible to allow the top section 14 to be folded over in position adjacent to the base 12, which, in conjunction with the tracks 50 and track slides 52, aids in removal of the apparatus 10 from the truck bed 100 and which also reduces wind resistance when the apparatus 10 is not being used to transport a large piece of glass. In addition, the alternative embodiment does not have a storage tube 48.

With respect to the above description then, it is to be realized that the optimum dimensional relationships for the parts of the glazier rack and tool chest apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A glazier rack and tool chest apparatus for transporting large glass pieces and glazier's tools for use in combination with a truck bed having hollows and ridges, the apparatus comprising:
   a trapezoidal hollow base having a front side spaced apart from a rear side, a top side, a bottom side having a greater width than the top side, a first side spaced apart from a second side wherein the first side forms a slanted side of the base, the base comprising:
      a front door in the front side;
      a first top access in the top side; and
      a second top access adjacent to the first top access in the top side;
   a hollow quadrangular top section having a first end spaced apart from a second end, a top edge spaced from a bottom edge, the bottom edge having a greater width than the top edge, and a front end spaced apart from a rear end, wherein the first end forms a slanted surface of the top section, the top section comprising:
      an elongated hinge continuously disposed along a junction of the base top side and the base first side as well as along the junction of the top section bottom edge and top section first end thereby connecting the top section and the base lengthwise whereby the apparatus forms a hexagonal shape when positioned in a collapsed position in which the top section is folded downwardly and is positioned horizontally adjacent to the base and further whereby the apparatus forms a trapezoidal shape when positioned in an extended position in which the top section is positioned atop the base with the first side of the base and first end of the top section aligned to support a large glass piece at an angled position for stable transport
      a cylindrical hollow storage tube disposed within and continuously running the entire length of the top section, said tube having a removable cover and a fastening means to removably secure the tube cover to the top section;
      a pair of identical side doors in the second end;
      wherein the first top access and second top access retain a selectively open position via struts;
   at least two identical parallel spaced apart tracks fastened lengthwise to hollows of the truck bed; and
   at least two identical parallel spaced apart track slides affixed lengthwise to the bottom side of the base in position to align with the tracks whereby the track slides removably slidingly engage the tracks.

2. The glazier rack and tool chest apparatus of claim 1 further comprising:
   a skin constructed from strong, lightweight material, including aluminum;
   a base frame; and
   a top section frame wherein the base frames and top section frame provide support for the exterior skin.

3. The glazier rack and tool chest apparatus of claim 1 wherein the fastening means is a wing nut.

4. The glazier rack and tool chest apparatus of claim 1 further comprising a plurality of latches wherein the latches selectively secure the front door, the first top access, the second top access, and the side doors into closed position.

5. The glazier rack and tool chest apparatus of claim 4 wherein the latches are lockable.

* * * * *